United States Patent [19]

Sekiguchi et al.

[11] Patent Number: 5,152,266
[45] Date of Patent: Oct. 6, 1992

[54] METHOD AND APPARATUS FOR CONTROLLING SOLENOID ACTUATOR

[75] Inventors: Akira Sekiguchi; Yoshinori Uchida; Yasuhiro Satoh, all of Higashimatsuyama, Japan

[73] Assignee: Zexel Corporation, Tokyo, Japan

[21] Appl. No.: 730,441

[22] Filed: Jul. 16, 1991

[30] Foreign Application Priority Data

Jul. 17, 1990 [JP] Japan .................................. 2-188238

[51] Int. Cl.⁵ .............................................. F02D 31/00
[52] U.S. Cl. ...................................... 123/357; 361/152
[58] Field of Search ............... 123/494, 357, 381, 503, 123/449, 490; 361/152, 170, 139, 210

[56] References Cited

U.S. PATENT DOCUMENTS

| | | | |
|---|---|---|---|
| 4,174,694 | 11/1979 | Wessel et al. | 123/381 |
| 4,374,386 | 2/1983 | Bildstein et al. | 361/152 |
| 4,380,728 | 4/1983 | Kearney | 361/152 |
| 4,556,926 | 12/1985 | Yanagida | 361/152 |
| 4,583,506 | 4/1986 | Okamoto | 123/357 |
| 4,594,979 | 6/1986 | Yasuhara | 123/357 |
| 4,603,668 | 8/1986 | Ueno | 123/352 |
| 4,667,117 | 5/1987 | Nebgen et al. | 361/152 |
| 4,708,111 | 11/1987 | Shiozaki et al. | 123/357 |
| 4,836,166 | 6/1989 | Wietelmann | 123/381 |
| 4,869,218 | 9/1989 | Fehlmann et al. | 123/381 |
| 4,915,072 | 4/1990 | Caron et al. | 123/494 |

FOREIGN PATENT DOCUMENTS

| | | | |
|---|---|---|---|
| 3324807 | 1/1985 | Fed. Rep. of Germany | 123/357 |
| 0198356 | 10/1985 | Japan | 123/494 |

Primary Examiner—E. Rollins Cross
Assistant Examiner—Thomas N. Moulis
Attorney, Agent, or Firm—Pollock, Vande Sande & Priddy

[57] ABSTRACT

For controlling a solenoid actuator in PID control mode in response to input control information, the temperature of the coil of the solenoid actuator is detected or estimated, and the constant or constants necessary for PID control calculation are determined taking into account the resulting temperature. The input control information is subjected to the processing operation for PID control operation by the use of the determined constant or constants, whereby desired PID control characteristics can be obtained irrespective of changes in the temperature of the coil of the solenoid actuator. As a result, in particular, the step response and other dynamic characteristics can be improved.

13 Claims, 7 Drawing Sheets

METHOD AND APPARATUS FOR CONTROLLING SOLENOID ACTUATOR

BACKGROUND OF THE INVENTION

1. Field of the Invention

The present invention relates to a method and an apparatus for controlling a solenoid actuator in a proportional integral and differential control mode.

2. Description of the Prior Art

It is well known that an effective method for controlling the position of, for example, various regulating members for internal combustion engines by means of a solenoid actuator, stably and with excellent response charactaristics is to control the amount of operation of the solenoid actuator in a proportional integral and differential (PID) control mode and to determine the appropriate constant for the PID control in accordance with the characteristics of the solenoid actuator. U.S. Pat. No. 4,603,668 discloses an improved method of this type, in which the control performance is further enhanced by determining each constant used for PID control in accordance with the difference between the target amount and the actual amount of the operation of the solenoid actuator.

However, the resistance value of the solenoid coil of the actuator depends upon a temperature and, therefore when the temperature of the solenoid actuator varies, the level of the current flowing through the solenoid coil may be shifted from the appropriate design value even if the voltage applied to the solenoid coil is constant. As a result, the dynamic control characteristics, in particular the step response characteristics, of the control of the solenoid actuator may be markedly changed. Thus, in the case where the temperature of the solenoid actuator varies for some reason, the values of the constants used for the PID control operation are shifted from the appropriate value, so that the dynamic characteristics, particularly the stability and/or the response characteristics may be degraded.

SUMMARY OF THE INVENTION

It is an object of the present invention to provide a method and an apparatus for controlling a solenoid actuator, which is capable of controlling the solenoid actuator properly even if the temperature of the solenoid actuator varies.

It is another object of the present invention to provide a method and an apparatus for controlling a solenoid actuator, in which each constant used for proportional, integral and differential control operation is determined taking into account the temperature of the solenoid actuator so as to obtain excellent temperature characteristics.

It is a further object of the present invention to provide a method and an apparatus for controlling a solenoid actuator, which is capable of appropriately controlling the solenoid actuator without the use of a special temperature sensor irrespective of changes in the temperature of the solenoid actuator.

According to the present invention, for controlling a solenoid actuator in PID control mode in response to input control information, the temperature of the coil portion of the solenoid actuator is detected and the constant or constants necessary for PID control calculation are determined taking into account the detected temperature. The input control information is subjected to the processing operation for PID control operation by the use of the determined constant or constants. As a result, it becomes possible to obtain desired PID control characteristics irrespective of changes in the temperature of the coil portion of the solenoid actuator, whereby, in particular, the step response and other dynamic characteristics can be improved.

While the temperature of the coil portion can be directly detected by the use of a thermosensitive element such as a thermistor attached to or mounted on the coil, other suitable arrangements can also be employed. For example, the temperature of the coil can be estimated from the amount of current flowing through the coil.

The constants used for PID control calculation may be determined by selecting an appropriate set of data from among a plurality sets of data in accordance with the temperature of the coil portion, or by determining a set of constants for PID control calculation suitable for the temperature of the coil portion or coil unit by carrying out a map calculation based on predetermined map data in response to data representing the temperature.

The invention will be better understood and other objects and advantages thereof will be more apparent from the following detailed description of preferred embodiments with reference to the accompanying drawings.

DESCRIPTION OF THE PREFERRED EMBODIMENTS

Figure 1:
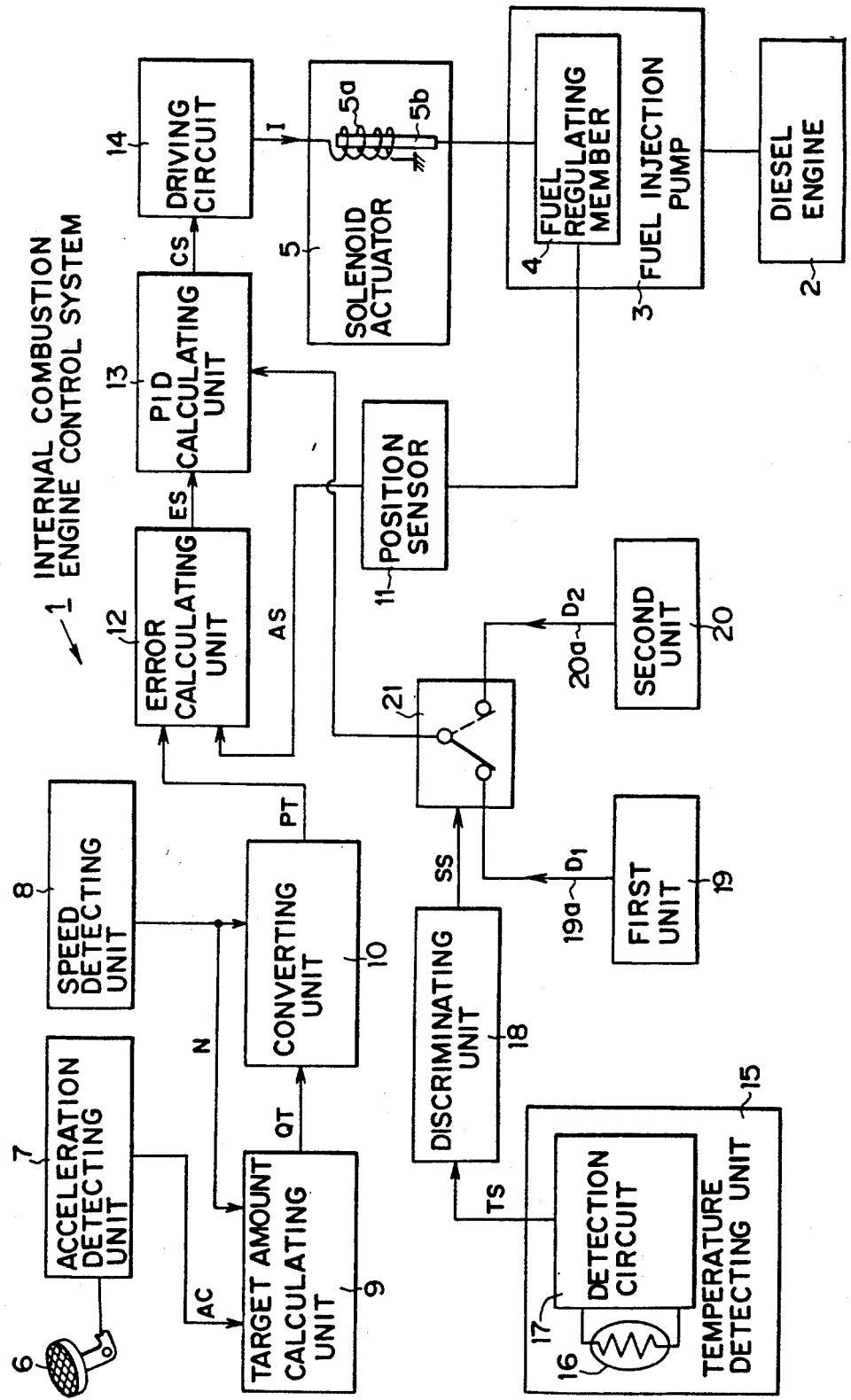
FIG. 1 is a block diagram of an embodiment of an internal combustion engine control system to which the present invention is applied.

FIG. 1 is a block diagram of an embodiment of an internal combustion engine control system provided with a solenoid actuator controlled in accordance with the present invention. The internal combustion engine control system 1 is for electronically controlling the amount of fuel injected from an fuel injection pump 3 to a vehicular diesel engine 2. The fuel injection pump 3 has a fuel regulating member 4 for regulating the fuel quantity to be supplied to the diesel engine 2 and a solenoid actuator 5 is coupled with the fuel regulating member 4 to regulate its position.

The solenoid actuator 5 is of well known design and has a tubular coil 5a and a plunger 5b made of magnetic material such as iron and free to move in and out of the coil 5a. The location of the plunger 5b is determined by the level of the current flowing through the coil 5a. For regulating the position of the fuel regulating member 4 by the use of the solenoid actuator 5 so as to operate the diesel engine 2 in accordance with prescribed governor characteristics, the internal combustion engine control system 1 has means for detecting the operation condition of the diesel engine 2. Specifically, the internal combustion engine control system 1 has an acceleration detecting unit 7 for generating an acceleration signal AC indicative of the amount of operation of an accelerator pedal 6 and a speed detecting unit 8 for generating a speed signal N indicative of the rotational speed of the diesel engine 2. The acceleration signal AC and the speed signal N are input to a target amount calculating unit 9.

The calculation for obtaining the target amount of fuel injection necessary for controlling the rotational speed of the diesel engine 2 in accordance with the prescribed governor characteristics is carried out by the target amount calculating unit 9 on the basis of the acceleration signal AC and the speed signal N, and a target amount signal QT indicating the target amount of fuel injection calculated by the target amount calculating unit 9 is produced. The target amount signal QT is applied to a converting unit 10 which also receives the speed signal N. The converting unit 10 calculates a target position of the fuel regulating member 4 necessary for obtaining the target fuel quantity represented by the target amount signal QT, and outputs a target position signal PT indicating the calculated target position.

The target position signal PT is sent to an error calculating unit 12 which also receives an actual position signal AS produced by a position sensor 11 coupled with the fuel regulating member 4 and indicating the actual position of the fuel regulating member 4. The difference between the target position signal PT and the actual position signal AS is calculated by the error calculating unit 12 to produce an error signal ES showing the difference between the target position indicated by the target position signal PT and the actual position indicated by the actual position signal AS.

The error signal ES is supplied to a PID calculating unit 13 as a control information signal for controlling the fuel regulating member 4 in a PID control mode and the error signal ES is processed for effecting the PID control of the fuel regulating member 4. A control signal CS is produced as a result of the processing operation of the error signal ES, and is supplied from the PID calculating unit 13 to a driving circuit 14 for driving the solenoid actuator 5, whereby a driving current having a level according to the control signal CS is supplied to the coil 5a of the solenoid actuator 5.

In order to determine the values of the constants for PID processing operation carried out in the PID calculating unit 13 in accordance with the temperature of the coil 5a, the internal combustion engine control system 1 has a temperature detecting unit 15 for detecting the temperature of the coil 5a of the solenoid actuator 5.

In this embodiment the temperature detecting unit 15 is consist of a thermosensitive resistance element 16 which is attached to the coil 5a by an appropriate adhesive or the like so as to have the same temperature as the coil 5a, and a detection circuit 17 connected with the thermosensitive resistance element 16, whereby an electric signal having a level corresponding to the resistance value of the thermosensitive resistance element 16 is produced from the detection circuit 17 as a detected temperature signal TS showing the coil temperature t (°C.) at that time. However, the constitution of the temperature detecting unit 15 is not limited to that shown in the embodiment of FIG. 1, and it is possible to employ other arrangements for producing an electric signal which is function of the temperature of the coil 5a instead.

The detected temperature signal TS is sent to a discriminating unit 18 to discriminate whether or not the coil temperature t detected by the temperature detecting unit 15 is higher than a prescribed temperature T (°C.). The discriminating unit 18 produces a switching control signal SS whose level is determined in accordance with the result of the discrimination. In this embodiment, the low level state of the switching control signal SS is established when t is lower than T, while the high level state thereof is established when t is not lower than T.

For enabling the constants used for PID control calculation, which are to be supplied to the PID calculating unit 13, to be changed in response to whether or not t is lower than T, the system 1 comprises a first unit 19 for providing first data $D_1$ representing the constants for PID control calculation used for the case where t is lower than T, and a second unit 20 for providing second data $D_2$ representing the constants for PID control calculation used for the case where t is not lower than T.

The output lines 19a and 20a of the first and second units 19 and 20 are connected to the PID calculating unit 13 through a switching unit 21, and the switching unit 21 is operated in response to the switching control signal SS. The switching unit 21 is arranged to assume the state indicated by the solid line for the low level of the switching control signal SS so that the first data $D_1$ is supplied to the PID calculating unit 13. On the other hand, the switching unit 21 operates to select the second data $D_2$ when the level of the switching control signal SS is high, so that the second data $D_2$ is supplied to the PID calculating unit 13.

With the foregoing constitution, the driving current I supplied to the solenoid actuator 5 depends upon the control signal CS obtained by processing of the error signal ES for PID control operation in order to operate the diesel engine 2 in accordance with the prescribed governor characteristics in response to the amount of operation of the accelerator pedal 6 and the engine speed, whereby the position of the fuel regulating member 4 is controlled. The constants used for the proportional integral and differential control operation described above are determined in accordance with data selected from among the first data $D_1$ and the second data $D_2$ in accordance with the temperature of the coil 5a detected by the temperature detecting unit 15.

As a result, the constants used for PID processing operation carried out in the PID calculating unit 13 are determined in accordance with the first data $D_1$ when the temperature T of the coil 5a is lower than the prescribed temperature T. On the other hand, the constants used for PID processing operation carried out in the PID calculating unit 13 are determined in accordance with the second data $D_2$ when the temperature t of the coil 5a is not lower than the prescribed temperature t.

Consequently, even if the resistance value of the coil 5a varies due to change in temperature and the response characteristics of the solenoid actuator 5 change owing to the change in the level of the driving current I supplied to the coil 5a due to variation in the resistance value of the coil 5a, the change in the response characteristic can be compensated for the change in the constants used for PID control operation, whereby the positional control of the fuel regulating member 4 can be carried out by means of the solenoid actuator 5 in accordance with the desired characteristics.

The foregoing embodiment is arranged to determine the constants used for PID control operation by selecting the first data $D_1$ or the second data $D_2$ in response to the detected temperature of the coil 5a. However, the present invention is not limited to the constitution of the embodiment shown in FIG. 1, and, for example, the necessary set of constants may be selected from among a plurality sets of constants for PID control by carrying out a map calculation in accordance with the detected temperature signal TS.

Figure 2:
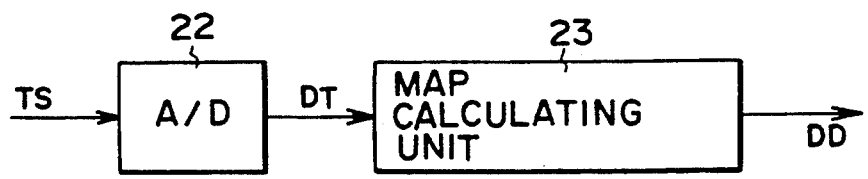
FIG. 2 is a block diagram showing another arrangement for determining the constants used for PID control calculation.

FIG. 2 is a concrete example of another arrangement for determining the constants used for PID control operation. In the arrangement shown in FIG. 2 the detected temperature signal TS is converted into digital form by an analog-digital convertor (A/D) 22 and the resulting temperature data DT corresponding to the detected temperature signal TS is sent to a map calculating unit 23, in which map data corresponding to the relationship between the temperature of the coil 5a and the respective constants for PID control is stored in advance.

Figure 3:
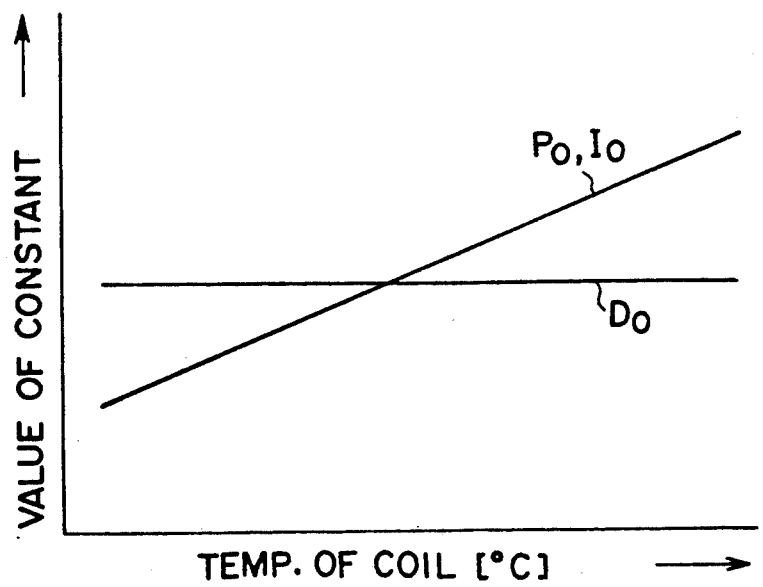
FIG. 3 is a graph showing the relationship between the temperature of the coil and the PID constants, and corresponds to the map data stored in the map calculating unit of FIG. 2.

FIG. 3 shows characteristic curves corresponding to the map data stored in the map calculating unit 23. As will be understood from FIG. 3, in this embodiment, both the constant value Po for proportional control and the constant value Io for integral control increase as the temperature of the coil increase. On the other hand, the constant value Do for differential control does not depend upon the temperature of the coil. The characteristics shown in FIG. 3 are of course only one example. Accordingly, the present invention is not limited to the characteristics shown in FIG. 3, and the relationship may be determined appropriately by taking account of the characteristics of the solenoid actuator.

The map calculation is carried out by the map calculating unit 23 in response to the temperature data DT and the set of data DD obtained by the map calculation is output as data showing the respective constants for PID control operation at that time. The data DD is supplied to the PID calculating unit 13.

With the constitution shown in FIG. 2, more suitable constants for PID control calculation can be supplied in accordance with the coil temperature as compared with the corresponding constitution shown in FIG. 1.

The embodiment illustrated in FIG. 1 describes by way of the example control according to the invention in which the solenoid actuator controls the position of the fuel regulating member of an internal combustion engine. However, the present invention is not limited only to this application, and the solenoid actuator control according to the present invention can be widely applied to, for example, a throttle control operation in a vehicle speed control system, a fuel injection advance control operation, and other various control operations.

In the embodiment shown in FIG. 1, the temperature of the coil 5a is detected by a thermosensitive element such as a thermistor attached to the coil 5a of the solenoid actuator 5. In fact, however, it is sometimes difficult to attach a thermosensitive element to the coil.

Figure 4:
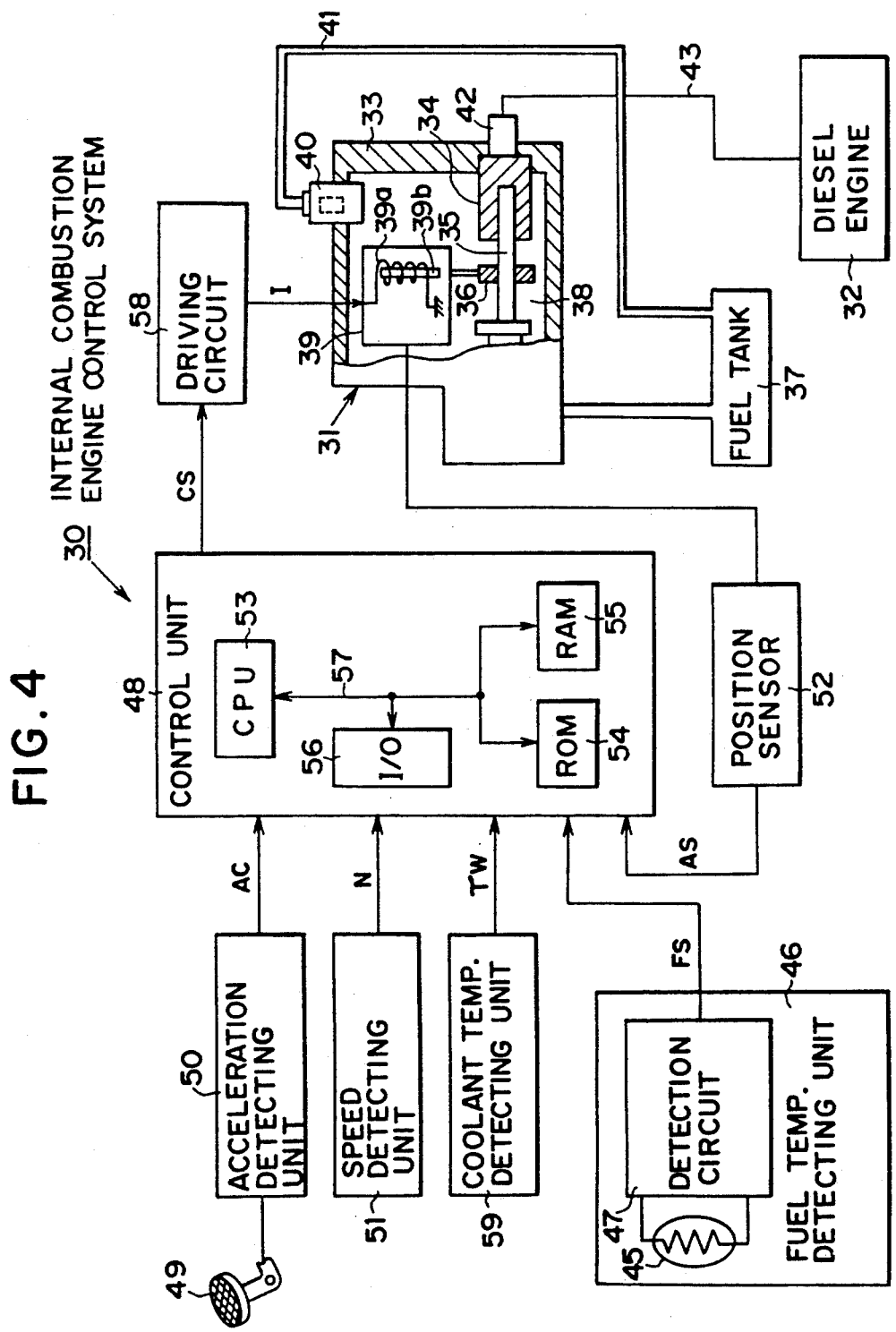
FIG. 4 is a block diagram of another embodiment of the internal combustion engine control system to which the present invention is applied.
Figure 5:
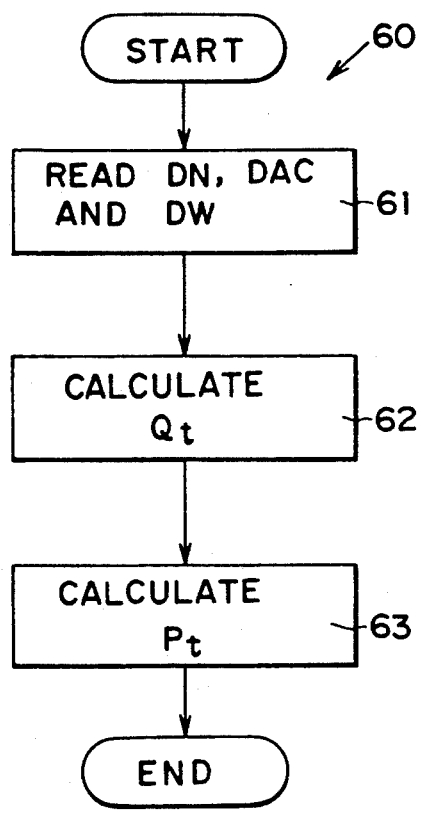
FIG. 5 is a flowchart showing a target value calculation program executed in the control unit of FIG. 4.
Figure 6:
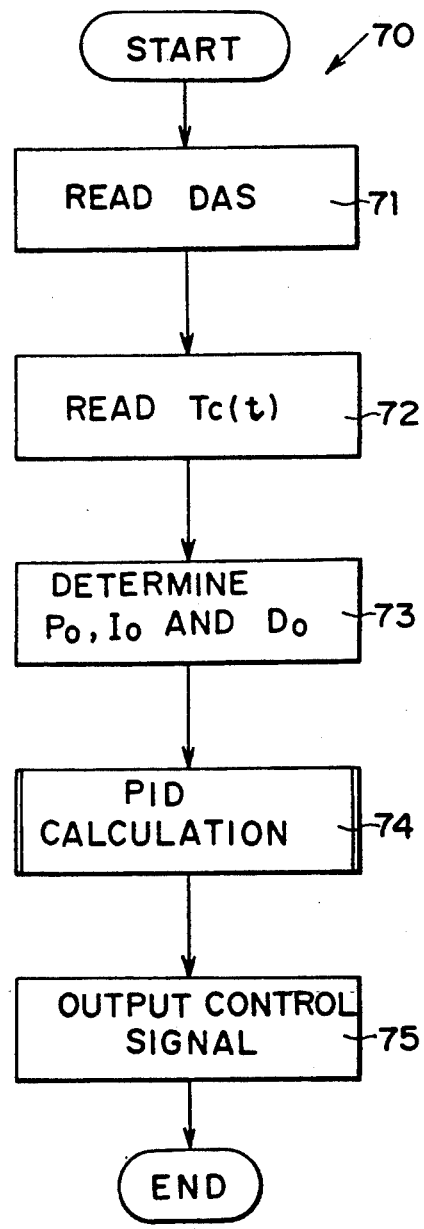
FIG. 6 is a flowchart showing a PID calculation program executed in the control unit of FIG. 4.

FIG. 4 illustrates another embodiment of the present invention in which the temperature of the coil of the solenoid actuator is estimated without direct attachment of a thermosensing element to the coil.

The internal combustion engine control system 30 according to the present invention, shown in FIG. 4 is for electronically controlling the amount of fuel supplied from a distribution type fuel injection pump 31 to a diesel engine 32.

The distribution type fuel injection pump 31 is of well-known design, in which a barrel 34 and a plunger 35 are installed within a pump housing 33 and the amount of fuel injected is regulated by the regulation of the position of a control sleeve 36 fitted on the plunger 35. The distribution type fuel injection pump 31 has a vane pump (not shown) and fuel stored in a fuel tank 37 is pressurized and supplied into a pump chamber 38, whereby the pump chamber 38 is filled with fuel.

For regulating the position of the control sleeve 36, the system 30 is provided in the pump chamber 38 with a solenoid actuator 39, which comprises a tubular coil 39a and a movable plunger 39b free to move in and out of the tubular coil 39a. The arrangement is the same as that of the solenoid actuator 5 shown in FIG. 1. The position of the movable plunger 39b is regulated by controlling the level of the driving current supplied to the coil 39b, whereby the position of the control sleeve 36 coupled with the movable plunger 39b is regulated.

More fuel than the necessary for fuel injection is supplied from the fuel tank 37 to the pump chamber 38 by the vane pump, and the surplus fuel in the pump chamber 38 is passed to the outside through an overflow valve 40 fixed to the pump housing 33 and returned through a drain pipe 41 to the fuel tank 37.

When the plunger 35 rotates with its reciprocal movement in the barrel 34, highly pressurized fuel is supplied from a delivery valve 42 in an amount corresponding to the position of the control sleeve 36. This highly pressurized fuel is sent through an injection pipe 43 to an injection nozzle (not shown) mounted on the diesel engine 32. Actually, a plurality of delivery valves and associated injection pipes are provided in the same number as the number of cylinders of the diesel engine 32. However, for simplifying the description, only one delivery valve and associated injection pipe are illustrated in FIG. 4. In the distribution type fuel injection pump 31 constituted in the forgoing manner, the temperature of the solenoid actuator 39 is substantially equal to that of the fuel in the pump chamber 38 insofar as the current flowing through the coil 39a has no warming effect.

For detecting the temperature of fuel in the pump chamber 38, the control system 30 comprises a fuel temperature detecting unit 46 including a thermosensitive resistance element 45. In this embodiment, the thermosensitive resistance element 45 is installed inside the over-flow valve 40 and connected with a detection circuit 47 for generating a fuel temperature signal FS indicative of the temperature TF of fuel in the pump chamber 38.

The fuel temperature signal FS is input to a control unit 48 for controlling the solenoid actuator 39. The control unit 48 further receives an acceleration signal AC showing the amount of operation of an accelerator pedal 49 from an acceleration detecting unit 50 and a speed signal N showing the rotational speed of the diesel engine 32 from a speed detecting unit 51.

Reference numeral 52 designates a position sensor coupled with the solenoid actuator 39 for producing an actual position signal AS representing the current position of the control sleeve 36. Thus, the actual position signal AS is related to the magnitude of the current flowing through the coil 39a and is supplied to the control unit 48 as both a positional feed-back signal and as information regarding the magnitude of the current supplied to the coil 39a of the solenoid coil 39. Furthermore, there is provided a coolant temperature detecting unit 59 for detecting the temperature of coolant of the diesel engine 32 and generating a coolant temperature signal TW indicative of the detected coolant temperature, which is input to the control unit 48.

The control unit 48 is arranged as a microcomputer and the constitution of the hardware of the control unit 48 is schematically illustrated in FIG. 4. Specifically, the control unit 48 has a central processing unit (CPU) 53, a read-only memory (ROM) 54, a random access memory (RAM) 55 and an input/output device (I/O) 56 which are interconnected by a bus 57. A predetermined control program is stored in advance in the ROM 54 and the input signals are processed in accordance with the control program to produce the control signal CS for controlling the solenoid actuator 39. The control signal CS is input to a driving circuit 58 and a driving current I corresponding to the control signal CS is supplied to the coil 39a.

The control program stored in the ROM 54 consists of a target value calculation program 60, a PID calculation program 70, an estimation program 80 and a monitor program 90, flowcharts of which are shown in FIGS. 5 to 8.

The PID control operation of the solenoid actuator 39 will now be described with reference to the flowcharts shown in FIGS. 5 to 8.

Figure 8:
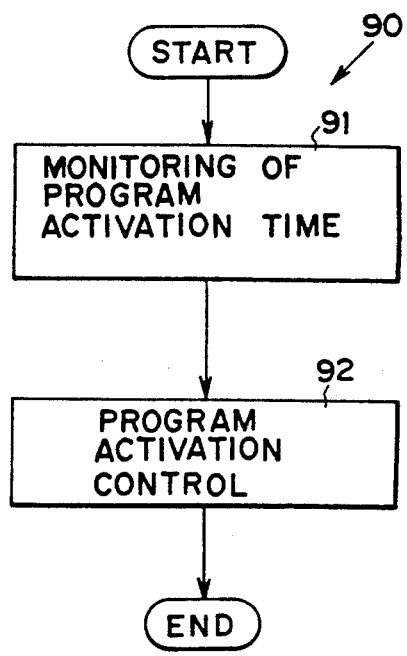
FIG. 8 is a flowchart showing a monitor program.

The monitor program 90 of FIG. 8 is for controlling the activation of the programs 60, 70 and 80 and is itself activated every 500 microseconds. The activation times of the programs 60, 70 and 80 are monitored in step 91. In step 92 it is checked for each program whether or not the subsequent activation time has come and the relevant program is activated at the prescribed time. Specifically, the target value calculation program 60 is activated every 10 milliseconds, the estimation program 80 is activated every 500 milliseconds and the PID calculation program 70 is activated ever 4 milliseconds.

After the activation of the target value calculation program 60, the operation moves to step 61, wherein speed data DN corresponding to the speed signal N, acceleration data DAC corresponding to the acceleration signal AC and coolant temperature data DW corresponding to the coolant temperature signal TW are read in. Then, the operation moves to step 62 in which a map calculation is carried out on the basis of the input data DN, DAC and DW to determine a target fuel quantity Q& necessary for controlling the rotational speed of the diesel engine 32 in accordance with the desired governor characteristic. After this, the operation moves to step 63 wherein the target position Pt of the control sleeve 36 necessary for obtaining the target quantity Qt is calculated by taking account of the engine speed shown by the speed data DN, and the execution of the program 60 at this time is terminated.

When the PID calculation program 70 is activated, the operation moves to step 71 in which actual position data DAS corresponding to the actual position signal AS showing the current position of the control sleeve 36 is read in. After this, the operation moves to step 72, in which data Tc(t) representing the temperature of the coil 39a at that time is read in. The data Tc(t) represents the coil temperature estimated by the execution of the estimation program 80 in a manner described later, and is stored in the RAM 55. In the following step 73, the values of the constants Po, Io and Do used for PID control operation are determined by map calculation, which is carried out on the basis of the temperature data Tc(t) read in step 72. This map calculation is substantially the same as that carried out in accordance with the arrangement shown in FIGS. 2 and 3.

Then the operation moves to step 74, in which the controlled variable for PID control, which is necessary for making the actual position of the control sleeve 36 shown by the actual position data DAS coincident with the target position Pt obtained in step 63 of the target value calculation program 60, is calculated by the use of the values of the constants Po, Io and Do determined in step 73. After this, the operation moves to step 75 in which the control signal CS is produced. The signal CS indicates the amount of operation of the solenoid actuator 39 necessary for realizing the controlled variable (see FIG. 4). The control signal CS from the control unit 48 is input to the driving circuit 58, and the necessary driving current I is provided to the coil 39a.

Figure 7:
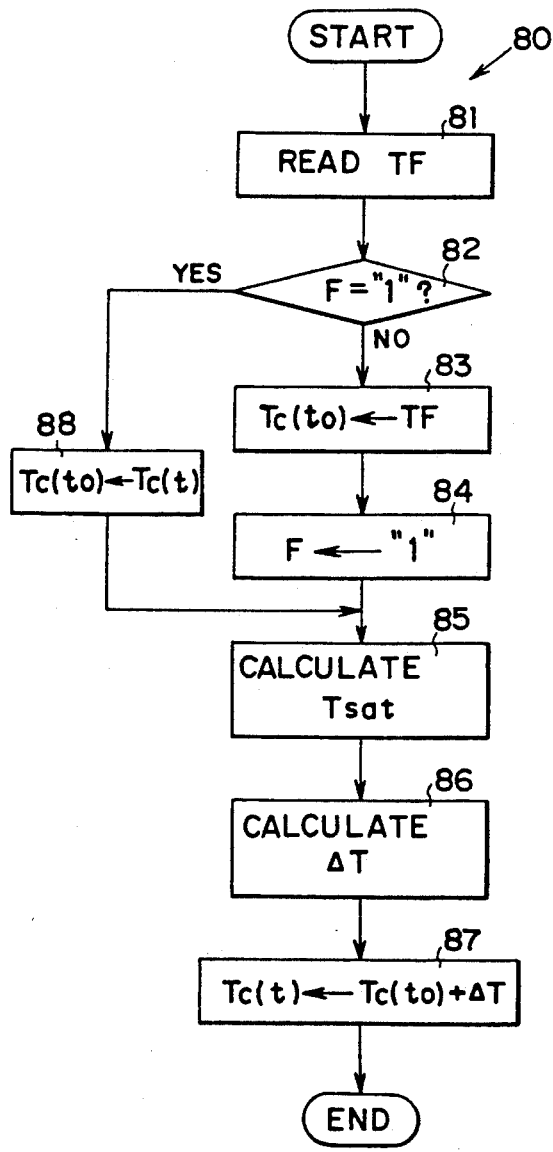
FIG. 7 is a flowchart showing an estimation program for estimating the temperature of the coil from the fuel temperature and the amount of operation of the solenoid actuator

Explanation will be now given to the estimation program 80 shown in FIG. 7.

When the estimation program 80 is activated, the operation moves to step 81 in which fuel temperature data TF corresponding to the fuel temperature signal FS is read. After this, the operation moves to step 82, in which discrimination is made as to whether or not a flag F is set. The flag F is cleared when the control system is turned on, so that the flag F is cleared at the time of the first execution of the estimation program 80. Therefore, the determination in step 82 becomes NO at this stage, and the operation moves to step 83, in which the fuel temperature data TF is set to estimated temperature Tc(to) indicative of the temperature of the coil 39a in the preceding program cycle. In the following step 84 the flag F is set.

Figure 9:
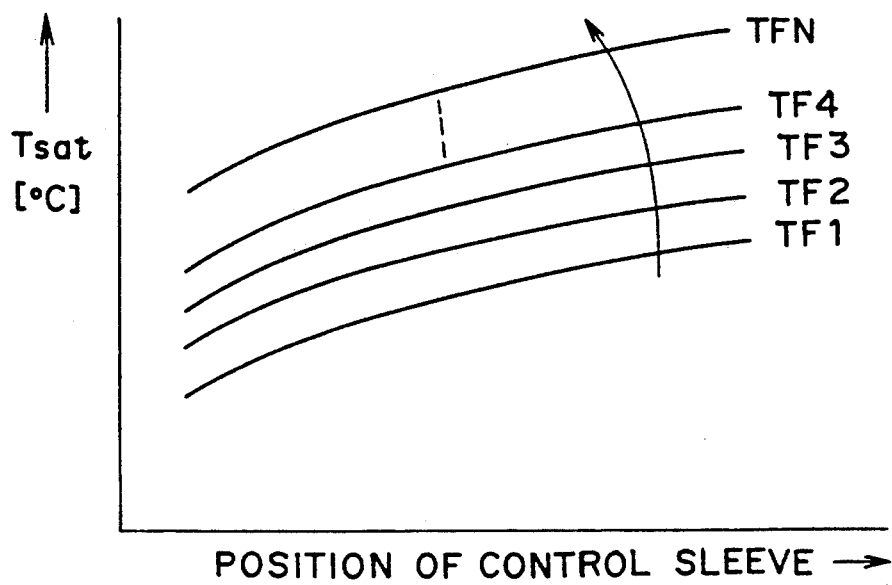
FIG. 9 is a graph showing characteristic curves corresponding to a map data used for determining the saturation temperature in the estimation program.

Then, the operation moves to step 85, in which map calculation for determining the saturation temperature $T_{sat}$ of the coil 39a is carried out on the basis of the fuel temperature data TF and the actual position data DAS relating the magnitude of the current flowing through the coil 39a. For performing this map calculation, three-dimensional map data corresponding to the characteristic curves shown in FIG. 9 is stored in ROM 54 in advance. The characteristic curves of FIG. 9 represent the relationship between the position of the control sleeve 36 and the saturation temperature $T_{sat}$ for each of the fuel temperatures $TF_1$, $TF_2$, ..., $TF_n$. That is, the characteristic curves define the saturation temperature of the coil 39a as a function of the fuel temperature and the position of the control sleeve 36. These curves can be determined in advance through experiment.

As described above, in step 85, map calculation for determining the saturation temperature $T_{sat}$ is carried out on the basis of the fuel temperature data TF read in step 81 and the actual position data DAS which was read in step 71 and stored in the RAM 55.

Then, the operation moves to step 86, in which the map calculation for determining the amount $\Delta T$ of change in temperature of the coil 39a per unit time is carried out on the basis of the saturation temperature $T_{sat}$ obtained in step 85 and the estimated temperature Tc(to) of the coil 39a. For this map calculation, first map data corresponding to the characteristic curve for temperature-increase shown in FIG. 10 and second map data corresponding to the characteristic curve for temperature-decrease shown in FIG. 11 are stored in the ROM 54.

Figure 10:
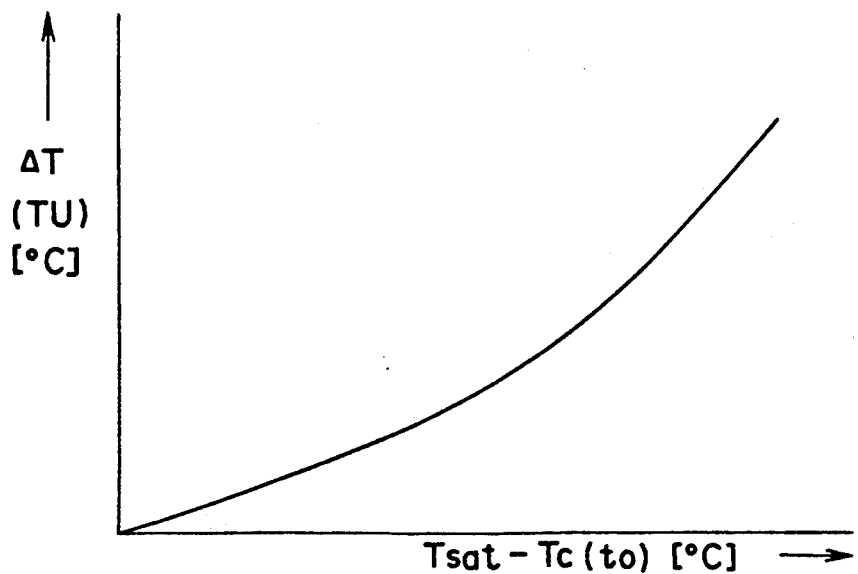
FIG. 10 is a graph showing a characteristic curve corresponding to map data used for determining a rate of temperature increase in the estimation program.
Figure 11:
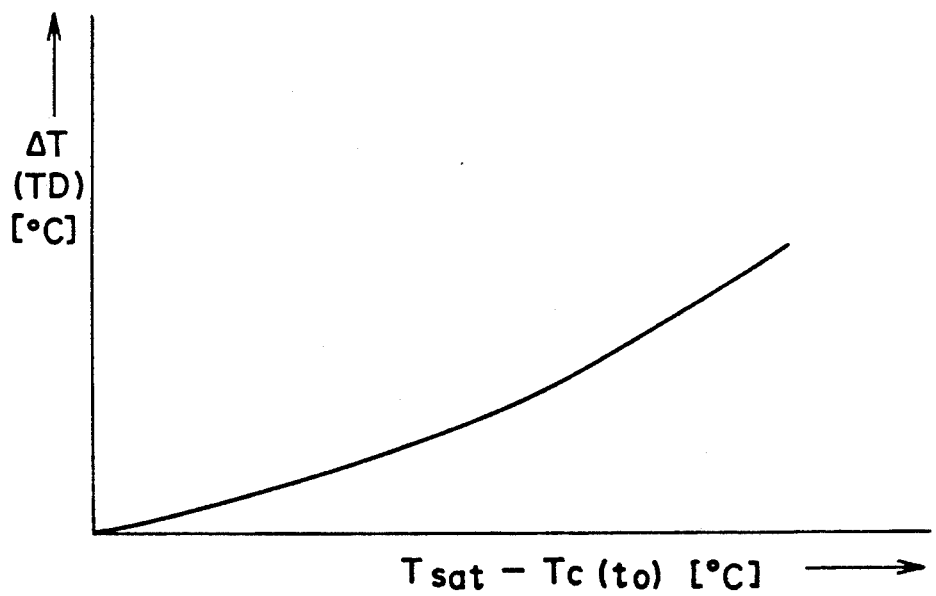
FIG. 11 is a graph showing a characteristic curve corresponding to map data used for determining a rate of decrease in coil temperature in the estimation program.

The characteristic curve of FIG. 10 represents the relationship between the temperature increase value TU of the coil 39a per unit time and the difference between the estimated saturation temperature $T_{sat}$ and the estimated coil temperature Tc(to) at that time. On the other hand, the characteristic curve of FIG. 11 represents the relationship between the temperature decrease value TD of the coil 39a per unit time and the difference between the estimated saturation temperature Tc(to) at that time in the case where the current estimated temperature is lower than the preceding estimated temperature. Therefore, in step 86, either the temperature increase value TU determined in accordance with the first map data or the temperature decrease value TD determined in accordance with the second map data is obtained as the amount $\Delta T$.

Then, the operation moves to step 87, in which the magnitude $\Delta T$ obtained in step 86 is added to or subtracted from the estimated temperature Tc(to) of the coil 39a to obtain the new estimated temperature data Tc(t) at this time. The estimated temperature data Tc(t) is read in step 72 of the foregoing PID calculation program 70 and the constants for PID control are determined in step 73 on the basis of the data Tc(t). Thus, the execution of the estimation program 80 is terminated at this time.

In the following executions of the estimation program 80, since the flag F is already set, the determination in step 82 becomes YES. Accordingly, the estimated temperature Tc(to) is replaced by the estimated temperature Tc(t) at this time, and the operation moves to step 85, in which the temperature of the coil 39a is estimated in a similar manner as described above. That is, in this case, the magnitude $\Delta T$ obtained in step 86 is added to or subtracted from the estimated temperature Tc(to) of the coil 39a to obtain the new estimated temperature data Tc(t) at this time.

As described above, in the control system 30 illustrated in FIG. 4, the fuel temperature and the position of the control sleeve 36, which corresponds to the magnitude of current flowing through the coil 39a, are detected and the temperature of the coil 39a is estimated by calculation from the aforesaid detected data. Consequently, it is possible for the system 30 to correct the constants for PID control in accordance with the temperature of the coil 39a without need for directly attaching a thermosensitive element to the coil 39a.

Although the fuel temperature is detected in the over-flow valve 40 in the forgoing embodiment of FIG. 4, the fuel temperature may be detected for estimating the temperature of the coil 39a at a place adjacent to the solenoid actuator 39, at an appropriate place in the pump housing 38, at a place the inside of the pipe 41 or elsewhere.

What is claimed is:

1. A method for controlling a solenoid actuator in a proportional integral and differential control mode in response to input control information, said method comprising the steps of:
   detecting a temperature of a coil portion of the solenoid actuator;
   determining constants necessary for carrying out the proportional integral and differential control operation of the solenoid actuator in accordance with the temperature detected in said detecting step;
   processing the input control information in accordance with the constants determined in said determining step to perform the proportional integral and differential control of the solenoid actuator; and
   controlling the solenoid actuator in accordance with the result obtained in said processing step.

2. A method as claimed in claim 1, wherein a thermosensitive element is attached to the coil portion and an electric signal corresponding to a value of the thermosensitive element is derived as information indicative of the temperature of the coil portion.

3. A method as claimed in claim 1, wherein the temperature detected in the detecting step is compared with a prescribed value and the constants are determined by selecting one set of data from among a plurality sets of data in accordance with the result of the comparing operation.

4. A method as claimed in claim 2, wherein map data corresponding to a relationship between the temperature of the coil portion and the necessary constants is prepared in advance, and the map calculation is carried out in accordance with the map data in response to the electric signal to determine the constants corresponding to the temperature of the coil portion.

5. A method for controlling a solenoid actuator in a proportional integral and differential control mode in response to input control information, said solenoid actuator being installed in a casing of a fuel injection pump for injecting fuel into a diesel engine in order to positionally regulate a fuel regulating member of the fuel injection pump, said casing being filled with fuel, said method comprising the steps of:
   detecting a temperature of the fuel in the casing;
   detecting an electric signal regarding a level of current flowing through a coil member of the solenoid actuator;
   estimating the temperature of the coil member from the temperature of the fuel and the electric signal;
   determining constants necessary for carrying out the proportional integral and differential control operation of the solenoid actuator in accordance with the temperature estimated in said estimating step;
   processing the input control information in accordance with the constants determined in said determining step to perform the proportional integral and differential control of the solenoid actuator; and
   controlling the solenoid actuator in accordance with the result obtained in said processing step.

6. A method as claimed in claim 5, wherein a signal indicating a position of the fuel regulating member is produced as the electric signal.

7. A method as claimed in claim 5, wherein said estimating step has a first step of determining an initial temperature of the coil member, a second step of calculating a saturation temperature of the coil member from the temperature of the fuel and the electric signal, a third step of calculating an amount of change in temperature of the coil member per unit time by taking account of the saturation temperature and the initial temperature: and a fourth step of calculating an estimated temperature of the coil member by taking into account the amount of change in temperature.

8. A method as claimed in claim 5, wherein the temperature of the fuel in the casing is detected in an overflow valve for deriving a surplus fuel from the casing.

9. A method as claimed in claim 5, wherein the temperature of the fuel in the casing is detected in the casing.

10. A method as claimed in claim 5, wherein the temperature of the fuel in the casing is detected at a place adjacent to the solenoid actuator.

11. A method as claimed in claim 5, wherein the temperature of the fuel in the casing is detected at a place inside of a pipe connecting an over-flow valve for draining a surplus fuel in the casing to outside.

12. An apparatus for controlling a solenoid actuator in a proportional integral and differential control mode in response to input control information, said apparatus comprising:
  means for generating a temperature signal representing a temperature of a coil portion of the solenoid actuator;
  means responsive to the temperature signal for determining constants necessary for carrying out the proportional integral and differential control operation of the solenoid actuator in accordance with the temperature of the coil portion;
  means for processing the input control information in accordance with the constants determined in said determining means to perform the proportional integral and differential control of the solenoid actuator; and
  means for providing a driving current to the solenoid actuator in accordance with the result obtained in said processing means.

13. An apparatus for controlling a solenoid actuator in a proportional integral and differential control mode in response to input control information, said solenoid actuator being installed in a casing of a fuel injection pump for injecting fuel into a diesel engine in order to positionally regulate a fuel regulating member of the fuel injection pump, said casing being filled with fuel, said apparatus comprising:
  a first means for generating a fuel temperature signal indicating a temperature of the fuel in the casing;
  a second means for generating a position signal representing a position of the fuel regulating member;
  means responsive to said first and second means for estimating the temperature of a coil member of the solenoid actuator;
  means for determining constants necessary for carrying out the proportional integral and differential control operation of the solenoid actuator in accordance with the temperature estimated in said estimating means;
  means for processing the input control information in accordance with the constants determined in said determining means to perform the proportional integral and differential control of the solenoid actuator; and
  means for providing a driving current to the solenoid actuator in accordance with the result obtained in said processing means.

* * * * *

UNITED STATES PATENT AND TRADEMARK OFFICE
CERTIFICATE OF CORRECTION

PATENT NO.   : 5,152,266
DATED        : October 6, 1992
INVENTOR(S)  : Sekiguchi, et al.

It is certified that error appears in the above-identified patent and that said Letters Patent is hereby corrected as shown below:

Column 11, line 4, change "ture:" to --ture,--.

Signed and Sealed this

Fourteenth Day of September, 1993

Attest:

BRUCE LEHMAN

*Attesting Officer*    *Commissioner of Patents and Trademarks*